United States Patent [19]

Giometti

[11] 4,092,870

[45] June 6, 1978

[54] ENGINE STARTING MECHANISM

[75] Inventor: Paul Francis Giometti, Horseheads, N.Y.

[73] Assignee: Facet Enterprises, Inc., Tulsa, Okla.

[21] Appl. No.: 718,510

[22] Filed: Aug. 30, 1976

[51] Int. Cl.[2] ...................... F02N 11/00; F16D 13/28; F16D 43/20

[52] U.S. Cl. .............................. 74/7 R; 74/230.17 M; 192/41 R; 192/54; 192/94

[58] Field of Search ............ 74/6, 7 R, 192, 230.17 B, 74/230.17 M; 192/41 R, 54, 94; 123/185 G

[56] References Cited

U.S. PATENT DOCUMENTS

| | | | |
|---|---|---|---|
| 1,095,696 | 5/1914 | Bijur | 74/7 X |
| 1,817,178 | 8/1931 | Dow | 74/7 |
| 1,883,331 | 10/1932 | Bijur | 74/6 |
| 1,995,116 | 3/1935 | Drissner | 74/7 X |
| 2,152,550 | 3/1939 | Koepfle | 74/7 |
| 2,364,019 | 11/1944 | Beall | 192/54 |
| 2,944,427 | 7/1960 | Antonidis et al. | 74/7 |

*Primary Examiner*—Allan D. Herrmann
*Attorney, Agent, or Firm*—Remy J. VanOphem

[57] ABSTRACT

The invention is an engine starting mechanism comprising first and second frictional gripping members carried by a sleeve member mounted to the shaft of a starting motor. The first and second frictional gripping members are adapted to engage an engine flywheel disc which is beveled to provide angular disposed opposed faces. Upon initiation of rotation of the starter shaft by the starter motor, the first frictional gripping member is adapted to move along an axial spline between the sleeve member and the frictional member thereby engaging one face of the beveled engine flywheel disc. The second frictional gripping member is caused to move axially with respect to the first member by the same helical spline on the sleeve member, thereby gripping the opposite face of the engine flywheel disc and causing the rotary movement of the starter motor shaft to be imparted to the flywheel disc.

6 Claims, 4 Drawing Figures

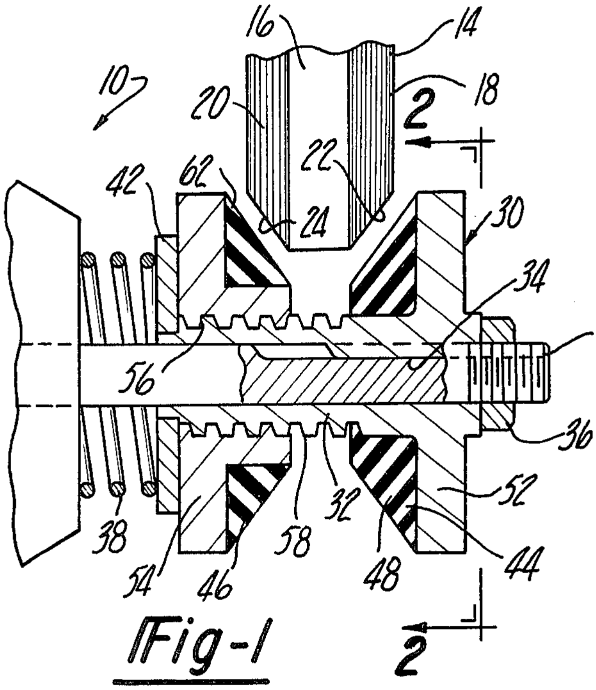
Fig-1
Fig-2
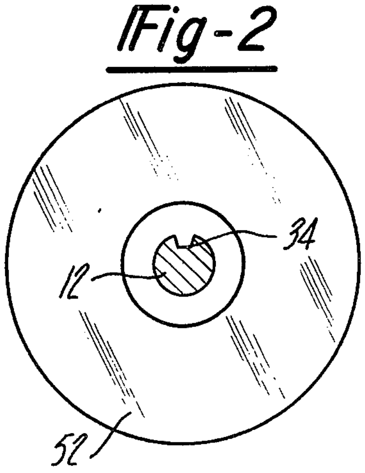
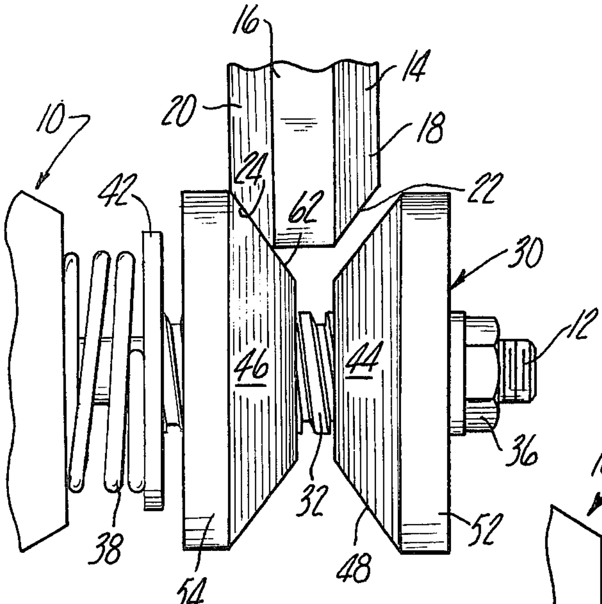
Fig-3
Fig-4
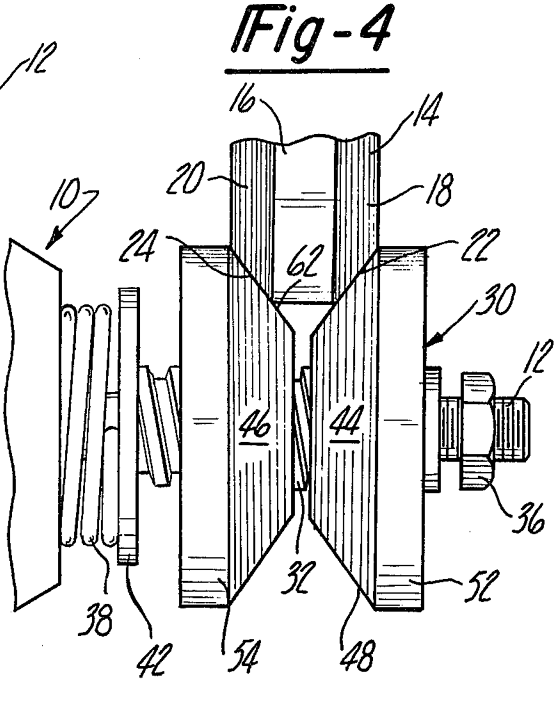

ENGINE STARTING MECHANISM

BACKGROUND OF THE INVENTION

The present invention relates to the field of starter mechanisms in general and, more particularly, to a frictional gripping mechanism for engaging a starter motor and an enging flywheel disc.

Modern motor vehicles employ an electric starter gearing mechanism for cranking an internal combustion engine. Such starter gearing mechanisms generally comprise an electric motor operably engagable to the engine flywheel disc by gear teeth on the periphery of the flywheel disc and a pinion gear mounted on a helical thread of the shaft of the electric motor. When the engine starting circuit is energized, the starting motor initiates rotation of the shaft. The resting inertia of the pinion gear causes its rotation to lag the rotation of the starting motor shaft so that the pinion gear is advanced axially along the helical thread of the shaft. The teeth of the pinion gear are carried into meshing engagement with the gear teeth on a periphery of the flywheel disc, thereby rotating the flywheel to start the engine.

In order to insure proper meshing engagement of the gear teeth of the pinion with that of the flywheel disc, it has become necessary to incorporate complicated and exacting gear tooth arrangements within the starter gearing. The resulting conventional engine starting gearing mechanism is, therefore, not only expensive, but also exhibits noisy operational characteristics. Further, the conventional starter gearing mechanism as installed in present motor vehicles, results in a substantial component of in thrust imparted to the flywheel disc.

SUMMARY OF THE INVENTION

The instant starting mechanism of this invention is relatively inexpensive, quiet, and provides the additional feature of frictionally gripping both of the opposite faces of the flywheel disc so that there is no substantial component of in thrust imparted to the flywheel disc.

The invention is a frictional engine starting mechanism to be used in combination with an engine flywheel disc or similar rotatable part attached to the engine for rotation therewith. More specifically, the invention is characterized by a starter motor having a shaft which is aligned from the peripheral edge of the flywheel disc. A sleeve member surrounds the starter shaft and is connected thereto by a spline which causes the sleeve member to rotate with the starter shaft and permits axial movement of the sleeve member relative the starter shaft. A first frictional gripping member is carried by the sleeve member on one side of the flywheel disc and has a frusto-conical friction surface for mating engagement with the juxtaposed beveled face of the flywheel disc. A second frictional gripping member is located on the other side of the flywheel disc and is mounted on the sleeve member by a helical thread which permits the second frictional member to rotate relative to the sleeve member while simultaneously moving axially toward or away from the first frictional gripping member and the flywheel disc. The second frictional gripping member has a frusto-conical friction surface for mating engagement with the juxtaposed beveled face of the flywheel disc. A stop abutment is provided on the end of the starter shaft to retain the sleeve member thereon. Another stop abutment is provided on the sleeve to prevent the second frictional gripping member from being rotated off the helical thread of the sleeve member. A spring acts on the sleeve member to urge the sleeve member to a normal axial position on the starter shaft wherein the first and second gripping members are spaced from engagement with the beveled faces of the flywheel disc.

Upon initiation of rotation of the starter shaft by the starting motor, the sleeve member and the first frictional gripping member are rotated with the starter shaft by the spline. The inertia of the second frictional gripping member causes its rate of rotation to lag that of the sleeve member so that the helical thread results in axial movement of the second frictional gripping member toward the first frictional gripping member. When the second frictional gripping member is advanced into frictional engagement with the juxtaposed beveled face of the then stationary flywheel disc, the rotation of the second frictional gripping member is further impeded. The continued rotation of the sleeve member causes the helical thread to carry the first frictional gripping member into engagement with the juxtaposed beveled face of the flywheel disc. Accordingly, the opposed beveled faces of the flywheel disc are respectively engaged by the first and second frictional gripping members so that the rotary movement of the starter shaft is imparted to the flywheel disc. When the engine begins to fire and the rotation of the flywheel disc begins to overrun the rotation of the starter shaft, the second frictional gripping member is moved axially by the helical thread and away from the first frictional gripping member and the flywheel disc to terminate the frictional driving engagement between the starter shaft and the flywheel disc. The spring returns the sleeve member to its normal axial position.

It is the object of the invention to provide an engine starting mechanism wherein a starter motor driven starting mechanism frictionally grips the engine flywheel disc to eliminate gear teeth at the interface between the starting motor and the flywheel disc.

It is a further object of the invention to provide a starting mechanism for frictional gripping both of the opposed faces of the flywheel disc so that there is no substantial component of end thrust imparted to the flywheel disc.

A still further object of the invention is to provide a frictional gripping engine starting mechanism which is self-centering with respect to the flywheel disc so as to accommodate and adjust for wear of the frictional gripping surfaces.

These and other featured objects and advantages of the invention will become apparent from the following detailed description of the preferred embodiment taken in conjunction with the accompanying drawings.

DESCRIPTION OF THE DRAWINGS

FIG. 1 is a fragmentary section view of the engine starting mechanism at rest, according to the invention.

FIG. 2 is a sectional view taken along line 2—2 of FIG. 1.

FIG. 3 is a side elevational view of the starting mechanism in an intermediate engaged position.

FIG. 4 is a side elevational view of the starting mechanism in frictional driving engagement with the engine flywheel disc.

DETAILED DESCRIPTION OF THE PREFERRED EMBODIMENT

Referring to FIG. 1, a starter motor 10 has a starter shaft 12 which is rotated when the starter motor 10 is energized by the vehicle operator. A flywheel disc 14 or like rotatable part of the engine has an axis of rotation which is parallel to the axis of rotation of the starter shaft 12. The flywheel disc 14 has a peripheral edge 16 and opposed faces 18 and 20. The peripheral edge 16 of the flywheel disc 14 is beveled to provide angularly disposed opposing faces 22 and 24. A frictional gripping mechanism, generally indicated at 30, is provided on the starter shaft 12 for selective frictional engagement with the opposed faces 22 and 24 of the flywheel disc 14.

The frictional gripping mechanism 30 includes a sleeve member 32 which surrounds the starter shaft 12 and is connected thereto by a spline 34. The spline 34 is comprised of mating axially extending teeth which are formed on the starter shaft 12 and on the inner surface of the sleeve member 32. The spline 34 connects the sleeve member 32 and the starter shaft 12 for unitary rotation and further permits axial movement of the sleeve member 32 on the starter shaft 12. A nut 36 is threadly engaged on the end of the starter shaft 12 and provides a stop abutment for retaining the sleeve member 32 on the starter shaft 12. A coil compression spring 38 has one end seated against the housing of the starter motor 10 and the other end seated against a stop ring 42 which is mounted on the sleeve member 32 as by welding or staking. The coil compression spring 38 urges the sleeve member 32 to the position of FIGS. 1 and 2 wherein the sleeve member 32 seats against the nut 36.

A pair of frictional gripping members 44 and 46 are provided on the sleeve member 32. The first frictional gripping member 44 is mounted on the end of the sleeve member 32 adjacent the outer end of the starter shaft 12 and is supported by a radial wall 52 of the sleeve member 32. The first frictional gripping memeber 44 has a frictional gripping face 48 which is spaced somewhat from the face 22 of flywheel disc 14 and at a complimentary angle therewith for mating engagement upon axial movement of the sleeve member 32 toward the flywheel disc.

The second frictional gripping member 46 is carried by a nut member 54 which has a helical thread 56 formed on a bore thereof for mating engagement with a matching helical thread 58 on the sleeve member 32. This helical thread connection between the nut member 54 and the sleeve member 32 permits the second frictional gripping member 46 to move rotationally and axially relative the first frictional gripping member 44. The second frictional gripping member 46 has a frictional face 62 which is spaced somewhat from the face 24 of the flywheel disc 14 as shown in FIGS. 1 and 2 when the nut member 54 is at its normal rest position engaging the stop ring 42.

As best seen in FIG. 1, the frictional gripping members 44 and 46 are of annular frusto-conical shape and are bonded or otherwise suitably attached to the sleeve member 32 and the nut member 54. The frictional gripping members 44 and 46 may be formed of a rubber, plastic, metallic, or other composition having suitable friction characteristics.

In operation, energization of an engine starting circuit by the vehicle operator energizes the starter motor 10 and imparts rotation to the starter shaft 12. The inertia of the nut member 54 and the second frictional gripping member 46 causes its rate of rotation to lag that of the sleeve member resulting in axial movement of the second frictional gripping member 46 toward the first frictional gripping member 44, along the mutually engaged helical threads 56 and 58. When the second frictional gripping member 46 is advanced into frictional engagement of its frictional face 62 with the juxtaposed beveled face 24 of the then stationary flywheel disc 14, as seen in FIG. 3, the rotary motion of the second frictional gripping member 46 is further impeded. The continued rotation of the sleeve member 32 by the spline 34 on the starter shaft 12 results in axially advancing the sleeve member 32 along the helical threads 56 and 58 toward the starter motor and against the bias of the coil compression spring 38. The helical threads 56 and 58 cause the frictional face 48 of the first frictional gripping member 44 to engage the juxtaposed beveled face 22 of the flywheel disc 14, as seen in FIG. 3. Accordingly, the opposed beveled faces 22 and 24 of the flywheel disc 14 are respectively engaged by the first and second frictional gripping members 44 and 46 so that the rotation of the starter shaft 12 is imparted to the flywheel disc 14.

When the engine begins to fire, the rotation of the flywheel disc 14 begins to overrun the rotation of the starter shaft 12 and the nut member 54 is moved axially along the helical threads 56 and 58 in the direction away from the first frictional gripping member 44 and the flywheel disc 14 to terminate the frictional driving engagement between the starter shaft 12 and the flywheel disc 14. The axial movement of the nut member 54 is limited by its engagement with the stop ring 42. The coil compression spring 38 biases the sleeve member rightwardly against the nut 36 to the normal position of FIGS. 1 and 2.

It will be understood that the spline 34 will allow the sleeve member 32 to move back and forth to accommodate any wobbling of the flywheel disc 14, thereby providing a starting mechanism which is self-centering with respect to the flywheel disc. Furthermore, it will be appreciated that the frictional gripping members 44 and 46 will be moved closer and closer to one another during successive startings of the engine to automatically compensate for wear of their respective friction faces 48 and 62.

Thus, the invention provides an engine starting mechanism which frictionally grips the engine flywheel disc without imparting an end thrust thereto and is self-centering to adjust for wear of the frictional gripping surfaces.

While only the preferred embodiment of the invention has been disclosed, it will be apparent to those skilled in the art that changes may be made to the invention as set forth in the appended claims and, in some cases, certain features of the invention may be used to advantage without corresponding use of other features. Accordingly, it is intended that the illustrative and descriptive materials herein be used to illustrate the principles of the invention and not to limit the scope thereof.

The embodiment of the invention in which an exclusive property or privilege is claimed is defined as follows:

What is claimed is:

1. An engine starting mechanism for rotating an engine mounted disc having opposed faces, said starting mechanism comprising:

a starter motor;

a starter shaft selectively rotated by the starter motor;

a sleeve member surrounding the starter shaft;

means acting between the starter shaft and sleeve member to rotate the sleeve member with the starter shaft and permit axial movement of the sleeve member relative to the starter shaft;

an inertia member surrounding the sleeve member;

first and second annular frictional gripping members respectively mounted on the sleeve member and the inertia member and adapted for engagement with the opposed faces of the engine mounted disc;

and helical means mounting the inertia member on the sleeve member so that upon initiation of rotation of the starter shaft the inertia member is moved axially of the sleeve member to carry the second frictional gripping member toward the first frictional gripping member whereby the opposed faces of the disc are drivingly engaged by the frictional gripping members to rotate the disc with the starter shaft.

2. In combination with a flywheel disc mounted on an engine and having a beveled peripheral edge providing angularly disposed opposing faces, the improvement comprising:

a starter motor having a starter shaft selectively rotated by the starter motor;

a sleeve member surrounding the starter shaft;

a spline connection between said starter shaft and said sleeve member to rotate the sleeve member with the starter shaft and permit axial movement of said sleeve member relative to said starter shaft;

an inertia member surrounding the sleeve member;

first and second annular frictional gripping members located on opposite sides of said flywheel disc and respectively having frusto-conical frictional surfaces adapted for mating engagment with the angularly disposed opposed faces of the engine mounted flywheel disc, said first frictional gripping member being mounted on the sleeve member and said second frictional gripping member being mounted on the inertia member; and a helical thread connecting the inertia member to the sleeve member so that upon initiation of rotation of the starter shaft, the inertia member is moved axially of the sleeve member by the helical thread whereby the angularly disposed opposed faces of the flywheel disc are drivingly engaged by the mating frusto-conical frictional surfaces of the frictional gripping members to rotate the disc with the starter shaft.

3. The engine starting mechanism of claim 2, further characterized by the sleeve member and the nut member having axially extending walls and radially extending walls for supporting the first and second annular frictional gripping members mounted thereon.

4. The engine starting mechanism of claim 2, further characterized by spring means urging the sleeve member to a normal rest position wherein the first frictional gripping member mounted thereon is spaced from engagement with the juxtaposed face of the flywheel disc.

5. The engine starting mechanism of claim 4, further characterized by stop means acting between the sleeve member and the inertia member to limit axial movement of the inertia member in the direction carrying the second frictional gripping member away from engagement with the juxtaposed face of the flywheel disc when firing of the engine causes the flywheel disc to overrun the rotation of the engine starting mechanism.

6. The engine starting mechanism of claim 5, further characterized by stop means acting between the starter shaft and sleeve member to limit axial movement of the sleeve member in the direction carrying the first frictional gripping member away from engagement with the juxtaposed face of the flywheel disc.

* * * * *